US011518839B2

(12) United States Patent
Reddy et al.

(10) Patent No.: US 11,518,839 B2
(45) Date of Patent: Dec. 6, 2022

(54) ALKYLPHENOL RESINS AND A METHOD OF PREPARING THEREOF

(71) Applicant: HEXION INC., Columbus, OH (US)

(72) Inventors: Ashok T. Reddy, Louisville, KY (US); Justyne Marie Willman, Louisville, KY (US)

(73) Assignee: BAKELITE UK HOLDING LTD.

( * ) Notice: Subject to any disclaimer, the term of this patent is extended or adjusted under 35 U.S.C. 154(b) by 4 days.

(21) Appl. No.: 16/992,848

(22) Filed: Aug. 13, 2020

(65) Prior Publication Data

US 2020/0369821 A1 Nov. 26, 2020

Related U.S. Application Data

(62) Division of application No. 15/335,693, filed on Oct. 27, 2016, now Pat. No. 10,982,034.

(60) Provisional application No. 62/248,114, filed on Oct. 29, 2015.

(51) Int. Cl.
*C08G 8/04* (2006.01)
*C08L 61/06* (2006.01)
*C08G 8/10* (2006.01)

(52) U.S. Cl.
CPC ............ *C08G 8/04* (2013.01); *C08G 8/10* (2013.01); *C08L 61/06* (2013.01)

(58) Field of Classification Search
CPC . C08J 3/11; C08J 5/24; C08J 2361/06; C08G 8/10; C08L 9/00; C08L 61/06; C08L 21/00; C08L 2666/16; C08K 5/09
USPC .......... 528/141, 143, 165; 524/511; 527/137
See application file for complete search history.

(56) References Cited

U.S. PATENT DOCUMENTS

| 2,131,249 | A | | 9/1938 | Balle |
| 3,708,554 | A | | 1/1973 | Oguri et al. |
| 4,239,869 | A | * | 12/1980 | Annis ............... C08G 8/00 264/328.2 |
| 4,448,951 | A | | 5/1984 | Rupert et al. |
| 4,740,424 | A | | 4/1988 | Schumacher et al. |
| 5,135,673 | A | | 8/1992 | Murata et al. |
| 5,412,058 | A | | 5/1995 | Dreyfus et al. |
| 6,828,383 | B2 | | 12/2004 | Durairag et al. |
| 7,074,861 | B2 | | 7/2006 | Durairag et al. |
| 7,498,371 | B2 | | 3/2009 | Durairaj et al. |
| 2005/0137379 | A1 | | 6/2005 | Howard et al. |
| 2006/0069191 | A1 | * | 3/2006 | Durairaj ............... C08L 61/12 524/284 |
| 2008/0090967 | A1 | | 4/2008 | Daily |
| 2009/0198008 | A1 | | 8/2009 | Matsumoto |
| 2012/0264864 | A1 | | 10/2012 | Vergelati et al. |
| 2014/0017612 | A1 | | 1/2014 | Reddy et al. |
| 2014/0080965 | A1 | | 3/2014 | Yunfeng et al. |
| 2016/0090474 | A1 | | 3/2016 | Sato |

FOREIGN PATENT DOCUMENTS

| CN | 1629116 | | 6/2005 |
| EP | 0400773 | B1 | 8/1994 |
| GB | 721713 | A | 1/1955 |
| GB | 790644 | | 2/2015 |
| JP | 02248417 | | 10/1990 |
| JP | 0353781 | A | 3/1991 |
| JP | 03241704 | A | 10/1991 |
| JP | 1992363240 | A | 12/1992 |
| KR | 20150135914 | | 4/2015 |
| RU | 2493177 | | 9/2013 |
| SU | 39116 | | 10/1934 |
| SU | 317678 | | 10/1971 |
| WO | 2004018402 | A1 | 3/2004 |
| WO | 2008048839 | A1 | 4/2008 |
| WO | 2009155747 | | 12/2009 |
| WO | 2015197295 | | 12/2015 |

* cited by examiner

*Primary Examiner* — Shane Fang
(74) *Attorney, Agent, or Firm* — Edmonds & Cmaidalka, P.C.

(57) ABSTRACT

Compositions, methods, and resins using alkyl aldehydes and phenols are provided herein. In one embodiment, a composition comprising an alkylphenol resin can be prepared by condensing at least one phenolic monomer selected from the group consisting of phenol, cresol, resorcinol, xylenol, ethyl phenol, alkylresorcinols, and combinations thereof; and at least one alkyl aldehyde having from 5 to 12 carbon atom alkyl groups. The alkylphenol resins of the application are free of octylphenol or nonylphenol monomers. In one embodiment, the alkylphenol resins may be prepared using formaldehyde, and alternatively, in another embodiment, the alkylphenol resins may be prepared without the use of formaldehyde. The process to make these new alternative alkylphenol resins is a cost effective process and easy to scale-up.

20 Claims, No Drawings

ALKYLPHENOL RESINS AND A METHOD OF PREPARING THEREOF

RELATED APPLICATION DATA

This application is a divisional application of co-pending U.S. patent application Ser. No. 15/335,693, filed Oct. 27, 2016, which application claims benefit to U.S. Provisional Application No. 62/248,114, filed Oct. 29, 2015, of which the entire contents of all applications are incorporated by reference herein.

BACKGROUND

Field of the Disclosure

The invention relates to resins and methods for preparing same. The invention particularly relates to alkylphenol resins and methods of preparing same.

Background of the Disclosure

Octylphenols are known to be of environmental concern. For example, since 1976, there has been a voluntary agreement in the United Kingdom that such compounds would not be employed in the production of detergents. At an international level, it is recommended that the use of octylphenols be phased out under the OSPAR Convention and it is listed as a substance for priority action under the Helsinki Convention, which protects the marine environments of the north-east Atlantic Ocean and Baltic Sea respectively.

Nonylphenols are also of environmental concern. The United States Environmental Protection Agency has taken the position that nonylphenol persist in the environment, particularly in the aquatic environment and that it is moderately bioaccumulative and extremely toxic to aquatic organisms. It is also the Environment Protection Agency's position that nonylphenol exhibits estrogenic properties in both in vitro and in vivo assays.

On Sep. 25, 2014 the Environmental Protection Agency proposed a Significant New Use Rule to require an in-agency review before a manufacturer starts or resumes use of 15 nonylphenols (NPs) and nonylphenol ethoxylates (NPEs).

Both octylphenol and nonylphenol are commonly used in production of alkylphenol resins. It would be desirable in the art of producing alkylphenol resins to prepare such resins using reduced or even no octylphenol and/or nonylphenol monomers thereby producing resins having little or no octylphenol or nonylphenol monomers.

SUMMARY

In one aspect, the invention is a composition comprising an alkylphenol resin is prepared by condensing a reaction mixture comprising phenolic monomers selected from the group consisting of phenol, cresol, resorcinol, xylenol, ethyl phenol, alkylresorcinols, and combinations thereof; and at least one alkyl aldehyde having from 5 to 12 carbon atom alkyl groups.

In another aspect, the invention is a method of making an alkylphenol resin comprising condensing a reaction mixture comprising phenolic monomers selected from the group consisting of phenol, cresol, resorcinol, xylenol, ethyl phenol, alkylresorcinols, and combinations thereof; and at least one alkyl aldehyde having from 5 to 12 carbon atom alkyl groups.

In still another aspect, the invention is an article of manufacture prepared using an alkylphenol resin prepared by condensing a reaction mixture comprising phenolic monomers selected from the group consisting of phenol, cresol, resorcinol, xylenol, ethyl phenol, alkylresorcinols, and combinations thereof; and at least one alkyl aldehyde having from 5 to 12 carbon atom alkyl groups.

Use of the alkylphenol resins of the application provides an environmentally acceptable solution to overcome regulatory concerns that are associated with conventional alkylphenol resins derived from octyl or nonyl phenols. In some embodiments, the alkenyl phenol resins are free of octylphenol and nonylphenol monomers (residual or otherwise). In other embodiments the alkenyl phenol resins of the application may also be formaldehyde free.

DESCRIPTION

In one embodiment of a method of the application, an alkylphenol resin is prepared by condensing a reaction mixture comprising at least one alkyl aldehyde and at least one phenolic monomer selected from the group consisting of phenol, cresol, resorcinol, xylenol, ethyl phenol, alkyl resorcinols, isomers thereof, and combinations thereof. Suitable isomers include ortho-, meta-, and para-isomers, such as ortho-, meta-, and para-cresol and the isomers can be used with the method of the application.

For the purposes of the application, alkyl resorcinols are dihydroxy benzenes having one or two alkyl chains present on the ring. The alkyl chains may have from 1 to 3 carbons.

The alkyl aldehydes useful with the method of the application are any aldehydes having from 5 to 12 carbon atom alkyl groups. In some embodiments, the alkyl aldehydes may be selected from the group consisting of 3,5,5-trimethyl hexanal, noanal, 2-ethyl hexanal, and combinations thereof.

It is important to note that the method of the application may be practiced in the substantial absence of both octylphenol and nonylphenol. For the purposes of this application, the term "substantial absence" means that the phenolic monomers have a concentration of octylphenol and nonylphenol monomers that is from 0% to less than 5% by weight of the total weight of phenolic monomers. In some embodiments, the concentration of these monomers is from 0% to less than 1% by weight. In still other embodiments and, the concentration of these monomers is from 0% to less than 0.1% by weight. In one embodiment, the phenolic monomers are free of octylphenol and nonylphenol.

The alkylphenol resins may also be in the form of novolac and resole resins. For forming the alkylphenol resins described herein, resole resins are formed when prepared using a base catalyst and novolacs when prepared using an acid catalyst. Examples of suitable base catalysts include sodium hydroxide, barium hydroxide, potassium hydroxide, calcium hydroxide, organic amines, sodium carbonate, and combinations thereof. Examples of suitable acid catalyst include hydrochloric acid, sulfuric acid, phosphoric acid, sulfonic acid, sulfamido acids, haloacetic acids, and combinations thereof. For example, in one embodiment, an acid catalyst used to prepare the alkenyl phenol aldehyde resins of the application is p-toluene sulfonic acid or dodecylbenzensulfonic acid.

Also, with the reaction of phenol monomers with aldehydes to prepare alkylphenol resins, the molar ratio of the reactants used in reaction may, in some embodiments, determine the molecular structure and physical properties of the resin. When it is desirable to prepare a novolac type resin, an aldehyde:phenol ratio between 0.5:1 and 1:1 (such as 0.5:1 to 0.8:1) with an acid catalyst will form novolac resins, which are thermoplastic in character. A higher aldehyde:phenol ratio (for example, more than 1:1 to 3:1) with a base catalyst will form resole resins, which are characterized by their ability to be thermally hardened at elevated temperatures.

The alkylphenol resins of the application may be in at least 3 different embodiments when regard to the presence or no-presence of formaldehyde.

In one embodiment, the alkylphenol resin is in the form of a formaldehyde free resin. For formaldehyde free alkylphenol resins the mole ratio of aldehyde to phenolic monomers may be from about 0.75:1 to about 0.9:1, for example, 0.85:1. Alkylphenol resins free of formaldehyde have a molecular weight (Mw) less than 2000 Daltons, such as from 1000 to less than 2000 Daltons.

When the alkylphenol resin is in the form of a formaldehyde free resin, it is prepared by performing a condensation reaction of a reaction mixture of the at least one alkyl aldehyde and the at least one phenolic monomer free of formaldehyde (formaldehyde monomers). In one embodiment, the alkylphenol and alkyl aldehyde are reacted in the presence of an acid catalyst. Suitable acid catalysts include, but are not limited to, inorganic or organic acids, such as hydrochloric acid, sulfuric acid, phosphoric acid, sulfonic acid, sulfamido acids haloacetic acids, or combinations thereof. Alternatively, the alkylphenol and alkyl aldehyde are reacted in the presence of a base catalyst. The alkylphenol resin may form a novolac resin when the acid catalyst is used and may form a resole resin when the base catalyst is used.

In another embodiment, formaldehyde is used to form the alkylphenol resin. The formaldehyde containing alkylphenol resins may be a novolac resin and a resole resin. The novolac resin may have a molecular weight from 2000 Daltons to 50000 Daltons and a resole resin may have a molecular weight from 2000 Daltons to 20000 Daltons.

For formaldehyde containing alkylphenol resins, the molar ratio may be described in a multi-step process as follows. For novolac resins having a molecular weight from 2000 Daltons to 50000 Daltons, the first step may have a mole ratio of aldehyde to phenolic monomers may be from about 0.25:1 to about 0.9:1, more preferred from about 0.5:1 to about 0.85:1, and in second step the mole ratio of formaldehyde to phenolic monomers may be from about 0.25:1 to about 0.75:1, and more preferred about 0.25:1 to about 0.5:1. For resole type resins having a molecular weight from 2000 Daltons to 20000 Daltons, the first step may have a mole ratio of aldehyde to phenolic monomers from about 0.25:1 to about 0.9:1, more preferred from about 0.5:1 to about 0.75:1, and in second step may have a mole ratio of formaldehyde to phenolic monomers may be from about 0.25:1 to about 1.25:1, and more preferred from about 0.5:1 to about 1:1.

For all of the described embodiments, an organic solvent may be used in the condensation reaction, which organic solvent may form an azeotrope with water. For example, in some embodiments of the method of the application, n-butanol, toluene, xylene, and mixtures thereof may be so employed. In one embodiment, the solvent and reactant mixture may be heated to remove water at a temperature of from about 90 to about 200° C. In some embodiments, the temperature range may be from about 100 to about 160° C.

In some embodiments, the solvents are also removed during or after the condensation reaction. In other embodiments, solvents which do not release protons under the condensation conditions may remain in the products after the condensation reaction.

After the resins are formed, the catalyst may be neutralized. The resins can be used directly or after the neutralization of the catalyst after the resins of the condensation process may be diluted or further diluted with aliphatic and/or aromatic hydrocarbons or hydrocarbon mixtures, for example, petroleum fractions, kerosine, decane, pentadecane, toluene, xylene, ethylbenzene, or other commercial solvents known to be useful to those of ordinary skill in the art.

The alkylphenol resins of the application are free or substantially free of octylphenol or nonylphenol monomers. These resins may also be made free of formaldehyde. The process to make these new alternative alkylphenol resins is a cost effective process and easy to scale-up.

One advantage of the method of the application is that both alkylation and polymerization reactions may occur simultaneously in one step. This can provide a substantial cost benefit, especially in commercial scaled up operations.

In conventional alkylphenol resins, the alky chain has been attached at para position of phenolic ring as a pendant group, whereas in alkylphenol resins of the application, the alkyl chain functions as a bridge between two phenolic rings and it is part of main polymer backbone. Because of this unique difference in polymer structure, the resins are expected to have unique chemical properties.

The Relative Solubility Number (RSN) values of the alkylphenol aldehyde resins are lower than similar molecular weight conventional alkylphenol resins derived from octyl or nonyl phenols. RSN is a method where the hydrophobic-hydrophilic composition of a non-ionic surfactant is determined. The RSN value is the amount of water needed to produce persistent or permanent turbidity. Overall the Relative Solubility Number (RSN) values of these new alkylphenol resins reported here are from about 7.5 to about 12.5, for example from about 8 to about 10.5, which values are lower when compared to similar molecular weight Bakelite PF6920CL nonylphenol novolac polymer made from nonylphenol and formaldehyde, the typical RSN value range for the Bakelite PF6920CL resin is between 13.0 to 17.0.

Another advantage of this new process is its versatility, by using a low quantity of formaldehyde the alkylphenol resins can be converted into higher molecular weight novolac resins and also they can be converted into thermally curable resole resins. At the same time, the use of mixed aldehyde technology reduces formaldehyde emissions.

EXAMPLES

The following examples are provided to illustrate the invention. The examples are not intended to limit the scope of the invention and they should not be so interpreted. Amounts are in weight parts or weight percentages unless otherwise indicated. Molecular weights are determined by GPC and are $M_w$ (weight average molecular weight).

Example 1

A formaldehyde free alkylphenol resin is prepared according to the following method:

1) Charge phenol, 4-dodecylbenzenesulfonic acid and solvent of aromatic hydrocarbon (naphthalene depleted; Sure Sol® 150 ND);
2) Heat reactor contents to 100° C.;
3) Gradually feed 3,5,5-trimethylhexanal;
4) Increase reaction temperature to 130° C. and reflux for 2 to 4 hours;
5) Remove water by an azeotrope distillation process at 140° C. for 6 to 10 hours;
6) Neutralize with 50% Sodium Hydroxide;
7) Vacuum distill residual water and solvent then pour out hot melt into a clean pan.

The ratio of phenol to 3,5,5-trimethylhexanal is 0.85. The resultant alkylphenol resin has a molecular weight of 1,812 and a polydispersity of 2.24. Also formation of polymer has been positively confirmed both by FTIR and $^{13}$C-NMR spectra. The Relative Solubility Number (RSN) value of 10.4 is lower compared to similar molecular weight Bakelite PF6920CL nonylphenol novolac polymer made from nonylphenol and formaldehyde, the typical RSN value range for the Bakelite PF6920CL resin is from 13.0 to 17.0.

Example 2

A formaldehyde free alkylphenol resin is prepared according to the following method:
1) Charge Phenol, 4-Dodecylbenzenesulfonic Acid and solvent of aromatic hydrocarbon (naphthalene depleted; Sure Sol® 150 ND)
2) Heat reactor contents to 100° C.;
3) Gradually feed 3,5,5-Trimethylhexanal;
4) Increase reaction temperature to 130° C. and reflux for 2 hours;
5) After reflux remove water by an azeotrope distillation process;
6) After 5-7 hours add light vacuum to remove the last amount of water present;
7) Cool the reaction flask to 40° C.;
8) Neutralize with 50% Sodium Hydroxide;
9) Mix for 10 minutes then pour resin solution out into a container.

The ratio of phenol to 3,5,5-trimethylhexanal is 0.73. The resultant alkylphenol resin has a molecular weight of 1,292, and a Relative Solubility Number of 9.73.

Example 3

A novolac alkylphenol resin is prepared according to the following method:
1) Charge Phenol, 4-Dodecylbenzenesulfonic Acid and solvent of aromatic hydrocarbon (naphthalene depleted; Sure Sol® 150 ND)
2) Heat reactor contents to 100° C.;
3) Gradually feed 3,5,5-Trimethylhexanal;
4) Reflux at 120° C. by an azeotrope distillation process for 7-10 hours removing the water that is collected over time;
5) Lower the reaction temperature to 100° C.;
6) Slowly feed 50% Formaldehyde over a period of 30 to 60 minutes;
7) Reflux the reaction at 100° C. for 2 hours;
8) Remove water by an azeotrope distillation process at 130° C. for 5 hours;
9) Cool the reaction mixture to 40° C.;
10) Neutralie with 50% Sodium Hydroxide;
11) Increase reaction temperature to 120° C. for distillation under light vacuum;
12) Once little to no water is coming over, cool down lightly and pour out.

The ratio of phenol to 3,5,5-trimethylhexanal is 0.5. The ratio of phenol to formaldehyde is 0.50. The resultant novolac resin has a molecular weight of 18,889, and a Relative Solubility Number of 7.94.

Example 4

A second novolac alkylphenol resin is prepared substantially identically to that of example 3. It has a molecular weight of 53,734 and a Relative Solubility Number of 8.17.

Example 5

A $3^{rd}$ novolac alkylphenol resin is prepared substantially identically to that of example 3. It has a molecular weight of 17,415.

Example 6

A resole alkylphenol resin is prepared according to the following method:
1) Charge Phenol and 4-Dodecylbenzenesulfonic Acid;
2) Heat to 95° C.;
3) Feed Nonanal;
4) Reflux at 130° C. for 5 hours;
5) Charge Butanol;
6) Cool to 60° C. and slowly charge 50% Sodium Hydroxide;
7) At 65° C. begin Formaldehyde feed;
8) Heat to 85° C. for resole reflux for up to 5 hours;
9) Cool to 40° C. then charge 37.5% Phosphoric Acid to neutralize;
10) Heat to 65° C. for vacuum distillation;
11) Once little to no water or Butanol is coming over end vacuum distillation and charge Methanol;
12) Filter through a 25 micron filter bag.

The ratio of phenol to 3,5,5-trimethylhexanal is 0.75. The ratio of phenol to formaldehyde is 1.22. The resultant resole resin has a molecular weight of 4,108. The percent solids concentration is 61.9%. Similar to standard resole resins, DSC of this resin also showed two different transitions, one at 154.8° C. and another at 213.5° C., indicating it is thermally cross-linked.

Example 7

A second resole alkylphenol resin is prepared substantially identically to that of example 6 except that the ratio of phenol to formaldehyde is 1.22. This resin has a molecular weight of 22,392 and a Relative Solubility Number of 7.49. The percent solids concentration is 59.9%.

Example 8

A Novolac alkylphenol resin is prepared according to the following method:
1) Charge Phenol and 4-Dodecylbenzenesulfonic Acid;
2) Heat to 100° C.;
3) Gradually feed 2-ethylhexanal;
4) Reflux at 120-140° C. by an azeotrope distillation process for 7-10 hours removing the water that is collected over time;
5) Cool the reaction mixture down to 100° C.;
6) Gradually feed Formaldehyde over a period of 30 to 60 minutes;

7) Reflux at 100° C. for 2 hours;
8) Remove water by an azeotrope distillation process at 130° C. for 5 hours;
9) Cool the reaction flask to 40° C.;
10) Charge 50% Sodium Hydroxide to neutralize the batch;
11) Heat to 120° C. for distillation under light vacuum;
12) Once little to no water is coming over, release vacuum and pour the reactor contents into a pan.

The ratio of phenol to 2-ethylhexanal is 0.75 and the ratio of phenol to formaldehyde is 0.25. The resultant novolac resin has a molecular weight of 1781, Relative Solubility Number of 11.8 and softening point of 98° C. The softening point of this resin is within the range of standard octylphenol novolac resin made from octylphenol and formaldehyde.

While the present invention has been described and illustrated by reference to particular embodiments, those of ordinary skill in the art will appreciate that the invention lends itself to variations not necessarily illustrated herein.

What is claimed is:

1. A method for making an alkylphenol resin, comprising:
   adding at least one phenolic monomer selected from the group consisting of phenol, cresol, resorcinol, xylenol, ethyl phenol, alkyl resorcinols, and combinations thereof and at least one alkyl aldehyde having from 5 to 12 carbon atoms in the presence of an acid catalyst to form a first reaction mixture;
   adding a base catalyst and formaldehyde to the first reaction mixture to form a second reaction mixture;
   reacting the second reaction mixture at conditions sufficient to form a reaction product comprising at least one alkylphenol resin; and
   performing a reflux or azeotropic distillation process to recover the at least one alkylphenol resin, wherein the at least one alkylphenol resin has a molecular weight of 2,000 Daltons to 50,000 Daltons and a relative solubility number (RSN) of about 7.5 to about 12.5.

2. The method of claim 1, wherein the alkylphenol resin acts as a tackifier.

3. The method of claim 1, wherein the alkyl aldehyde is selected from the group consisting of 3,5,5-trimethyl hexanal, nonanal, 2-ethyl hexanal, and combinations thereof.

4. The method of claim 1, wherein the alkyl resorcinols comprise dihydroxy benzenes having one or two alkyl chains present on a ring.

5. The method of claim 4, wherein the alkyl chains present on the ring comprise from 1 to 3 carbons.

6. A rubber composition, comprising the alkylphenol resin of claim 1, wherein the alkylphenol resin is present in the composition in the range of from 1 to 10 parts per hundred rubber.

7. The method of claim 1, wherein a ratio of the at least one alkyl aldehyde to the at least one phenolic monomer is 0.5 to 1.0.

8. The method of claim 1, wherein the reflux or azeotropic distillation process comprises a temperature from 100° C. to 140° C.

9. The method of claim 1, further comprising providing a solvent with the at least one phenolic monomer.

10. The method of claim 1, wherein the reacting the second mixture is performed in the presence of an organic solvent that forms an azeotrope with water.

11. The method of claim 1, wherein a ratio of the at least one alkyl aldehyde to the at least one phenolic monomer is greater than 1.0.

12. The method of claim 1, wherein the formaldehyde is added before the base catalyst.

13. The method of claim 1, wherein the formaldehyde is added after the base catalyst.

14. A method for making an alkylphenol resin, comprising:
    mixing at least one phenolic monomer, at least one alkyl aldehyde having from 5 to 12 carbon atoms, formaldehyde, at least one acid catalyst, and at least one base catalyst to provide a reaction mixture comprising the at least one phenolic monomer, at least one alkyl aldehyde having from 5 to 12 carbon atoms, formaldehyde, at least one acid catalyst, and at least one base catalyst, wherein:
      the at least one phenolic monomer is selected from the group consisting of phenol, cresol, resorcinol, xylenol, ethyl phenol, and alkyl resorcinols; and
      the acid catalyst is selected from the group consisting of hydrochloric acid, sulfuric acid, phosphoric acid, sulfonic acid, sulfamido acids haloacetic acids, and combinations thereof, to form an intermediate product;
    reacting the reaction mixture at conditions sufficient to form a reaction product comprising at least one alkylphenol resin; and
    distilling the reaction product to recover the at least one alkylphenol resin, wherein the at least one alkylphenol resin has a molecular weight of 2,000 Daltons to 50,000 Daltons and a relative solubility number (RSN) of about 7.5 to about 12.5.

15. The method of claim 14, wherein the at least one alkylphenol resin is a resole.

16. The method of claim 14, wherein the at least one alkylphenol resin is a novolac.

17. The method of claim 14, wherein the reaction mixture further comprises an organic solvent selected from the group of an aliphatic hydrocarbon solvent, an aromatic hydrocarbon solvent or combination therein.

18. The method of claim 14, wherein a mole ratio of the formaldehyde to the at least one phenolic monomers is about 0.25:1 to about 1.25:1.

19. A method for making an alkylphenol resin, comprising:
    mixing at least one phenolic monomer, at least one alkyl aldehyde having from 5 to 12 carbon atoms, formaldehyde, at least one acid catalyst, at least one base catalyst, and an organic solvent to provide a reaction mixture comprising the at least one phenolic monomer, at least one alkyl aldehyde having from 5 to 12 carbon atoms, formaldehyde, at least one acid catalyst, at least one base catalyst and organic solvent, wherein:
      the at least one phenolic monomer is selected from the group consisting of phenol, cresol, resorcinol, xylenol, ethyl phenol, and alkyl resorcinols;
      the acid catalyst is selected from the group consisting of hydrochloric acid, sulfuric acid, phosphoric acid, sulfonic acid, sulfamido acids haloacetic acids, and combinations thereof, to form an intermediate product;
      the organic solvent is selected from the group consisting of an aliphatic hydrocarbon solvent, an aromatic hydrocarbon solvent or a combination thereof;
      the reaction mixture comprises less than 5 wt % of octylphenol and nonylphenol monomers, based on the total weight of the at least one phenolic monomer; and
      a mole ratio of the formaldehyde to the at least one phenolic monomers is about 0.25:1 to about 1.25:1, reacting the reaction mixture at conditions sufficient to form a reaction product comprising at least one alkylphenol resin; and distilling the reaction product to provide a condensate product comprising the at least one alkylphenol resin, wherein the at least one alkylphenol resin has a molecular weight of 2,000 Daltons to 50,000 Daltons and a relative solubility number (RSN) of about 7.5 to about 12.5, and wherein the reaction product is free of formaldehyde.

20. The method of claim 19, wherein the at least one alkylphenol resin is a resole or a novolac.

\* \* \* \* \*